US012406480B2

(12) United States Patent
Sahni et al.

(10) Patent No.: US 12,406,480 B2
(45) Date of Patent: Sep. 2, 2025

(54) ANNOTATION SYSTEM FOR SURGICAL CONTENT

(71) Applicant: Verb Surgical Inc., Santa Clara, CA (US)

(72) Inventors: Nishant Shailesh Sahni, Milpitas, CA (US); Peijmon Kasravi, San Jose, CA (US); Darrick Tyler Sturgeon, Oakland, CA (US); Jocelyn Elaine Barker, San Jose, CA (US)

(73) Assignee: Verb Surgical Inc., Santa Clara, CA (US)

( * ) Notice: Subject to any disclaimer, the term of this patent is extended or adjusted under 35 U.S.C. 154(b) by 507 days.

(21) Appl. No.: 17/868,858

(22) Filed: Jul. 20, 2022

(65) Prior Publication Data

US 2023/0343079 A1  Oct. 26, 2023

Related U.S. Application Data

(60) Provisional application No. 63/333,919, filed on Apr. 22, 2022.

(51) Int. Cl.
*G06V 10/778* (2022.01)
*G06F 3/0482* (2013.01)
(Continued)

(52) U.S. Cl.
CPC ........ *G06V 10/7788* (2022.01); *G06F 3/0482* (2013.01); *G06F 3/0488* (2013.01);
(Continued)

(58) Field of Classification Search
CPC ............. G06V 10/7788; G06V 10/774; G06V 10/945; G06V 20/70; G06V 2201/03; G06F 3/0482; G06F 3/0488; G06F 3/04883
See application file for complete search history.

(56) References Cited

U.S. PATENT DOCUMENTS

| 10,394,937 B2 * | 8/2019 | Fein ..................... G06Q 10/101 |
| 2013/0297307 A1 * | 11/2013 | Paek ....................... G10L 15/26 |
|  |  | 704/235 |

(Continued)

FOREIGN PATENT DOCUMENTS

| EP | 2902927 A1 * | 8/2015 | ............. G06F 16/58 |
| EP | 3748640 A1 * | 12/2020 | ............ G06F 16/116 |

(Continued)

OTHER PUBLICATIONS

International Search Report and Written Opinion issued in App. No. PCT/IB2023/054039, mailing date Aug. 4, 2023, 12 pages.

*Primary Examiner* — Molly Wilburn
*Assistant Examiner* — Emma N. Luke
(74) *Attorney, Agent, or Firm* — AMSEL IP LAW PLLC; Jason Amsel

(57) ABSTRACT

An annotation system facilitates collection of labels for images, video, or other content items relevant to training machine learning models associated with surgical applications or other medical applications. The annotation system enables an administrator to configure annotation jobs associated with training a machine learning model. The job configuration controls presentation of content items to various participating annotators via an annotation application and collection of the labels via a user interface of the annotation application. The annotation application enables the participating annotators to provide inputs in a simple and efficient manner, such as by providing gesture-based inputs or selecting graphical elements associated with different possible labels.

20 Claims, 7 Drawing Sheets

(51) Int. Cl.
  *G06F 3/0488* (2022.01)
  *G06V 10/774* (2022.01)
  *G06V 10/94* (2022.01)
  *G06V 20/70* (2022.01)

(52) U.S. Cl.
  CPC .......... *G06V 10/774* (2022.01); *G06V 10/945* (2022.01); *G06V 20/70* (2022.01); *G06V 2201/03* (2022.01)

(56) References Cited

U.S. PATENT DOCUMENTS

| | | | |
|---|---|---|---|
| 2014/0181716 A1* | 6/2014 | Merritt | G16H 30/40 |
| | | | 715/771 |
| 2016/0171682 A1 | 6/2016 | Abedini | |
| 2016/0210411 A1* | 7/2016 | Mentis | G06F 3/0304 |
| 2021/0074425 A1 | 3/2021 | Carter | |
| 2021/0366106 A1* | 11/2021 | Yao | G06F 21/6254 |
| 2023/0016464 A1* | 1/2023 | OConnor | G06N 20/00 |

FOREIGN PATENT DOCUMENTS

| | | | | |
|---|---|---|---|---|
| WO | 2020219305 A1 | 10/2020 | | |
| WO | 2021106018 A1 | 6/2021 | | |
| WO | WO-2022035609 A1 * | 2/2022 | ......... | G06F 18/2155 |

\* cited by examiner

600

Create Job ✕

| | |
|---|---|
| Name | Job Class |
| [Tool Identificatio] | [Resident Annotato ▾] |
| Type | Bucket Location |
| [Multi-Select ▾] | [ai-datascience-ext ▾] |
| Description | Folder Name |
| Tool Identification Job | [AL_Sample/ ▾] |
| | Number of Judgements |
| | [1] |
| | Number of Labels |
| | [4] |
| Attachment Url | Labels |
| [ ] | [Grasp] [Scisso] [Staple] [Caute] |
| Job Question | Status |
| [Identify the tool] | [Waiting] |

[Create] [Cancel]

Assign Job ✕

● Users ○ Groups

User Name nsahni
pkasravi
dsturgeon
jbarker

Job Name

[tool_presence_2_te ▾]

Status

[Waiting]

[Assign] [Cancel]

FIG. 7

Annotator Database Query

Query: [                    ] [Submit]  [Users] [Jobs] [Assigned Jobs] [User Groups] [Assigned Groups] [Get Result]

SELECT*FROM job ORDER BY id DESC;

[Download]

| id | name | type | description | attachement_url | question | annotator_class | label_options | number_judgements |
|---|---|---|---|---|---|---|---|---|
| 197 | OOB_gateway_test_test_Job7 | 1 | | | Is a Tool Present? | Resident Annotator | Absent, Present | 1 |
| 196 | OOB_gateway_test_test_Job6 | 1 | | | Is a Tool Present? | Resident Annotator | Absent, Present | 1 |
| 195 | AL_OOB_Test_4 | 1 | | | Is this frame OOB? | Resident Annotator | In, Out | 1 |
| 194 | AL_OOB_Test_3 | 1 | | | Is this frame OOB? | Resident Annotator | In, Out | 1 |
| 193 | AL_OOB_Test_2_test_job | 1 | | | Is the Frame OOB? | Resident Annotator | Absent, Present | 1 |
| 189 | AL_test_connection_test_job | 1 | | | Is a Tool Present? | Resident Annotator | Absent, Present | 1 |
| 188 | al_test_test_job | 1 | | | Is a Tool Present? | Resident Annotator | Absent, Present | 4 |
| 187 | NRGY_MPLR | 1 | Monopolar Presence Detection | | Is Monopolar Present or Absent? | Medically Trained | Present, Absent | 1 |
| 186 | NRGY_MPLR_Test | 1 | Monopolar Presence Detection | | Is Monopolar Present or Absent? | Medically Trained | Present, Absent | 1 |
| 185 | OOB_AL_pipeline_train_val_job | 1 | | | Is the frame out of body? | Resident Annotator | In, Out | 3 |
| 184 | OOB_AL_pipeline_test_job | 1 | | | Is this frame out of body? | Resident Annotator | In, Out | 3 |
| 183 | AL_Test_10_train_val_job | 1 | | | Is this frame out of body? | Resident Annotator | In, Out | 1 |
| 182 | AL_Test_10_test_job | 1 | | | Is this frame out of body? | Resident Annotator | In, Out | 1 |

FIG. 8

ANNOTATION SYSTEM FOR SURGICAL CONTENT

CROSS-REFERENCE TO RELATED APPLICATIONS

This application claims the benefit of U.S. Provisional Patent Application No. 63/333,919 filed on Apr. 22, 2022, which is incorporated by reference herein.

BACKGROUND

Technical Field

The described embodiments relate to an annotation system for obtaining annotations of surgical content for training machine learning models.

Description of the Related Art

Machine learning models enable automatic generation of predictions from videos, images, animations (e.g., gifs), and other medical data. These predictions are useful to assist physicians in diagnosing patients, performing surgical procedures, and recommending treatments. In supervised learning processes, machine learning models are trained using large data sets that have been annotated to describe their contents or characteristics. However, obtaining reliable annotations traditionally involves significant time investment from physicians or researchers that have deep expertise in the specific field of relevance. As a result, it can be challenging to obtain sufficient training data to meaningfully train or improve these types of machine learning models.

SUMMARY

In a first embodiment, a method facilitates training of a machine learning model for predicting characteristics of a content item including an image or video associated with surgical applications. An annotation job associated with a machine learning model is configured to specify at least one annotator, a predefined set of selectable labels, and a target number of judgments. A content item is obtained. The machine learning model is applied to generate a prediction associated with the content item and a confidence metric associated with the prediction. The confidence metric is evaluated to determine if the confidence metric meets a predefined confidence threshold. Responsive to the confidence metric failing to meet the confidence threshold, the content item is added to an annotation set for receiving annotations via an annotation application. The annotation application facilitates presentation of the content item to the at least one annotator via a user interface of the annotation application. At least one selected label from the predefined set of selectable labels is obtained from the annotation application. It is determined if the target number of judgments is met for the content item. Responsive to the target number of judgments being met, parameters of the machine learning model are updated based on the at least one selected label and the content item.

In an embodiment, obtaining the at least one selected label comprises identifying a swipe gesture performed with respect to the user interface, and selecting between the predefined set of labels based on a direction of the swipe gesture.

In an embodiment, obtaining the at least one selected label comprises facilitating via the user interface, presentation of user interface elements respectively associated with the predefined set of labels, and selecting between the predefined set of labels based on a selection of one of the user interface elements.

In an embodiment, configuring the annotation job further comprises obtaining a labeling rule indicating a number of selectable labels that can be selected for the content item by a single annotator.

In an embodiment, obtaining the at least one selected label comprises enforcing via the user interface, selection of one and only one of the predefined set of labels.

In an embodiment, obtaining the at least one selected label comprises enabling via the user interface, selection of any number of the predefined set of labels.

In an embodiment, the annotation system automatically facilitates presentation of another content item via the user interface of the annotation application of the client device responsive to obtaining the at least one selected label.

In an embodiment, the target number of judgments comprises a number of unique annotators that have provided at least one label for the content item.

In another embodiment, a non-transitory computer-readable storage medium stores instructions that when executed by one or more processors causes the one or more processors to perform steps as follows. A content item associated with an annotation job is presented for an annotator via a user interface of an annotation application. The content item comprises a surgical image or video and a predefined set of selectable labels associated with the surgical image or video. A swipe gesture performed by the annotator via the user interface is identified. At least one selected label from the predefined set of selectable labels is determined based on the swipe gesture. The selected label is stored in association with the content item. An additional content item associated with the annotation job is presented via the user interface.

In an embodiment, determining the at least one selected label comprises selecting only a single selected label for association with the content item.

In an embodiment, determining the at least one selected label comprises selecting multiple selected labels for association with the content item.

In an embodiment, determining the at least one selected label comprises selecting between a first predefined label in response to the swipe gesture being performed in a first direction and second predefined label in response to the swipe gesture being performed in a second direction opposite the first direction.

In an embodiment, determining the at least one selected label comprises selecting between a first predefined label in response to the swipe gesture being performed in a first direction, a second predefined label in response to the swipe gesture being performed in a second direction, a third predefined label in response to the swipe gesture being performed in a third direction, and a fourth predefined label in response to the swipe gesture being performed in a third direction.

In an embodiment, the content item comprises at least one of an image, a video, and an animation.

In an embodiment, the instructions when executed further cause the one or more processors to perform steps including presenting a control element to flag the content item for review by an administrator, and storing the flag in association with the content item responsive to selection of the control element.

In an embodiment, the instructions when executed further cause the one or more processors to perform steps including tracking a state of the annotation job that records progress of annotations received for a set of content items associated with the annotation job, and responsive to the annotation application closing a re-opening, configuring the annotation job based on the tracked state.

In another embodiment, a method facilitates training of a machine learning model for predicting characteristics of a content item including an image or video associated with surgical applications. An annotation job associated with a machine learning model is configured to specify a predefined set of selectable labels for labeling a content item and a labeling rule indicating a number of selectable labels that can be selected for the content item by a single annotator. The content item is obtained. Presentation of the content item is facilitated via a user interface of the annotation application. At least one selected label from the predefined set of selectable labels is obtained from the annotation application. Parameters of the machine learning model are updated based on the at least one selected label and the content item.

In an embodiment, obtaining the at least one selected label comprises identifying a swipe gesture performed with respect to the user interface, and selecting between the predefined set of labels based on a direction of the swipe gesture.

In an embodiment, obtaining the at least one selected label comprises facilitating via the user interface, presentation of user interface elements respectively associated with the predefined set of labels, and selecting between the predefined set of labels based on a selection of one of the user interface elements.

In an embodiment, configuring the annotation job further comprises identifying a set of annotators associated with the job for presenting the content item.

BRIEF DESCRIPTION OF THE DRAWINGS

FIG. 6 is example of a user interface screen for creating an annotation job.

FIG. 7 is example of a user interface screen for assigning an annotation job to a set of annotators.

FIG. 8 is example of a user interface screen for viewing a list of annotation jobs.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. Wherever practicable, similar or like reference numbers may be used in the figures and may indicate similar or like functionality.

An annotation system facilitates collection of labels for images, video, animations (e.g., gifs), or other content items relevant to training machine learning models associated with surgical applications or other medical applications. The annotation system enables an administrator to configure annotation jobs associated with training a machine learning model. The configuration of the annotation job controls presentation of content items to various participating annotators via an annotation application and facilitates collection of the labels via a user interface of the annotation application. The annotation application enables the participating annotators to provide inputs in a simple and efficient manner, such as by providing gesture-based inputs or selecting graphical elements associated with different possible labels.

Figure 1:
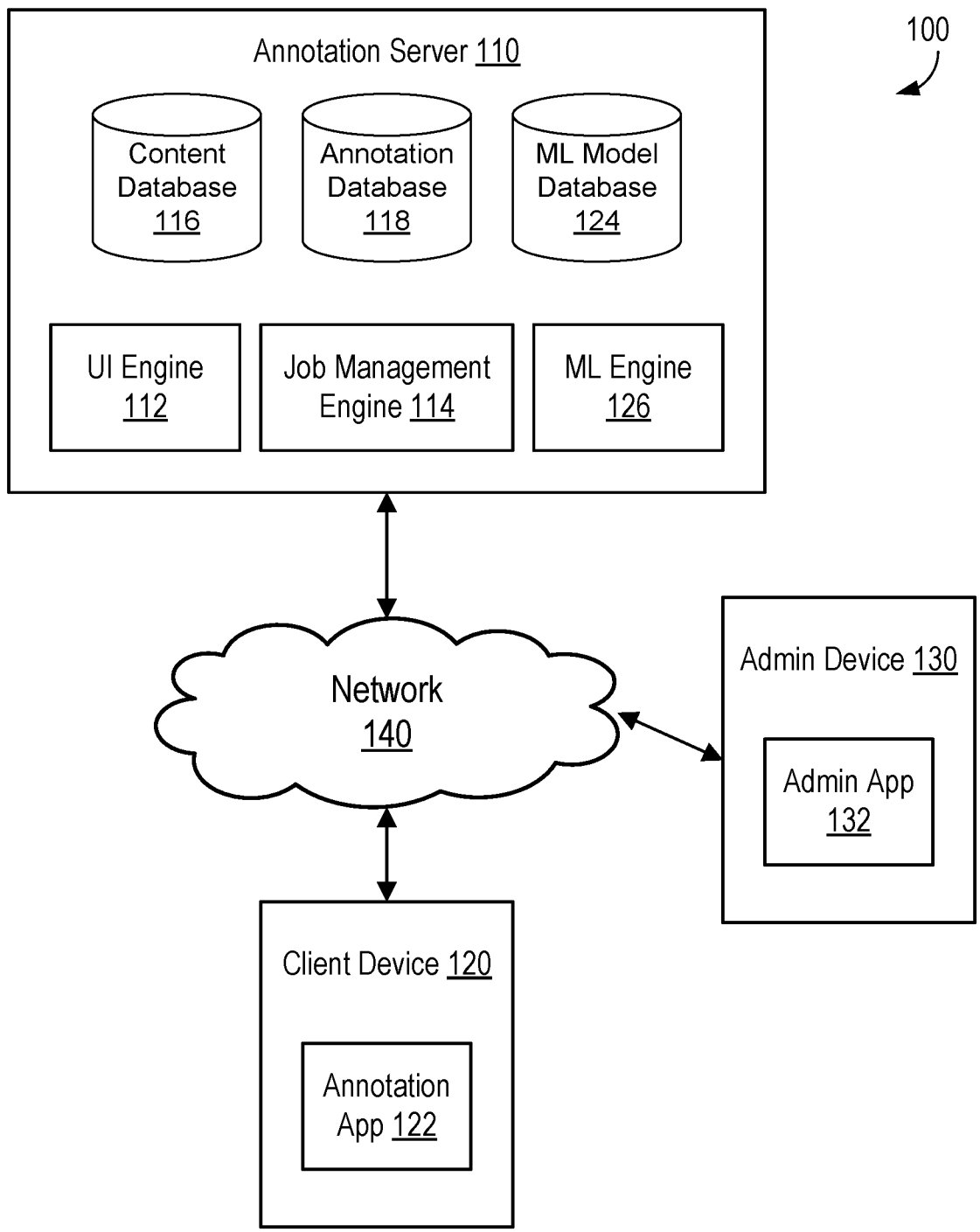
FIG. 1 is an example embodiment of a computing environment for facilitating collection of labels associated with training machine learning models for medical applications.

FIG. 1 illustrates an example embodiment of an annotation system 100 for obtaining annotations of medical images, video, animations (e.g., gifs) or other medical data. The annotation system 100 comprises an annotation server 110, one or more client devices 120, one or more administrative devices 130, and a network 140.

The annotation server 110 comprises one or more computing devices that interacts with the client device 120 and the administrative device 130 via the network 140 to carry out the various functions described herein. The annotation server 110 may comprise a single physical server, a set of distributed physical servers, a cloud server, one or more virtual machines or containers executing on one or more physical servers, or a combination thereof. The annotation server 110 includes at least a processor and a non-transitory computer-readable storage medium that stores instructions for execution by the processor in order to carry out the functions attributed to the annotation server 110 described herein.

In an embodiment, the annotation server 110 comprises a user interface engine 112, a job management engine 114, a machine learning (ML) engine 126, a content database 116, an annotation database 118, and a machine learning (ML) model database 124. Alternative embodiments may comprise different or additional components.

The job management engine 114 controls a set of jobs associated with obtaining annotations to facilitate training of machine learning models. Generally, each job involves identifying a set of training content items stored to the content database 116, obtaining a set of annotations for the training content items for storing to the annotation database 118, and generating or updating a machine learning model (in the ML model database 124) based on the training content items and the associated annotations. A job may be created and managed based on a job description provided by an administrator via the administrative application 132 of the administrative device 130 (described in further detail below) that indicates the various parameters associated with the job.

The job description may identify the content items associated with a job directly (e.g., by associating a unique identifier of a content item with the job) or based on a set of configurable characteristics. For example, a job description may identify content items for inclusion in a training set by specifying one or more types of content item (e.g., image, video, animation (e.g., gifs), illustration, text, etc.), one or more sources of the content items, a time or location associated with creation of the content item, one or more characteristics of the content item (e.g., encoding type, quality, resolution, size/length, etc.), one or more tags associated with the content item, or various metadata describing the content items. In this manner, content items meeting the specified criteria may be automatically added to a training set associated with a particular job based on the configured parameters in the job description.

A job description may also specify labeling rules comprising various parameters or constraints associated with obtaining the annotations. For example, the job description may specify a set of predefined labels that an annotator chooses between, which may vary in number depending on the labeling rules. For example, some jobs may have labeling rules enforcing a binary classification in which the annotator is requested to select, for each content item, one label from a set of two predefined labels. Other jobs may have labeling rules specifying a multi-label classification request in which the annotator is requested to select one label from a set of three or more predefined labels. Other jobs may be configured to allow for multi-label selection in which the annotator may select any number of labels from a predefined set of labels (e.g., select anywhere between zero labels and all labels) or some other predefined quantity or quantity range of labels (e.g., select between zero and two labels from a set of four labels, select exactly two labels from a set of five labels, etc.) Other jobs may allow for freeform text labels, in which the annotator is not necessarily limited to a predefined set of labels.

A job description may furthermore optionally specify a set of control inputs that correspond to different ones of the predefined labels. For example, the job description may assign specific touch screen gestures to specific labels (e.g., swipe left, swipe right, swipe up, swipe down, etc.). In other embodiments, the control inputs may be automatically assigned.

A job description may furthermore specify a configured number of judgments representing the number of labels that once received from different annotators for a given content item, causes the content item to be added to the training set for training the machine learning model. For example, if the number of judgments is set to five, a content item will be marked as unannotated if it was reviewed and annotated by less than five annotators. Once the content item receives the five labels, the job management engine 114 may mark the content item as annotated and may utilize it in the training set. In example embodiment, the job management engine 114 may enforce a requirement that all received labels agree before adding the content item to the training set. Alternatively, the job management engine 114 may enforce a predefined threshold level of agreement while still allowing for some disagreement (e.g., 5 out of 6 labels match). In some embodiments, the job management engine 114 may remove a content item from the content database 116 (or remove the association with the job) if it observes at least a threshold level of disagreement for the labels received from the annotators.

A job description may furthermore identify a set of annotators for receiving content items associated with the job for annotation. The set of annotators may be identified directly (e.g., using a user identifier for the annotator) or based on a set of specified criteria. For example, a job description may specify a set of annotators based on characteristics such as field of expertise, level of experience, location, availability, or other user data specified in a user profile for an annotator. Alternatively, annotators may be preassigned to one or more groups, and the job description may identify annotators based on the group. The job management engine 114 may then limit participation in the job to the identified set of annotators.

The content database 116 stores content that has been annotated or may be selected for annotation by the annotation system 100. The content may include, for example, medical images, medical video, animations (e.g., gifs), illustrations, text-based patient data, or other medical data. In some embodiments, the content database 116 may include non-medical images, video, animations (e.g., gifs), or other data. The content in the content database 116 may include associated metadata describing characteristics of the associated content generated at the time of capture such as the type of content (e.g., image, video, animation, illustration, text, etc.), when it was created, where it was created, entities involved in the creation, permissions associated with the content, file size, encoding format, or other metadata.

The annotation database 118 stores annotations associated with content in the content database 116. Annotations may comprise, for example, descriptive labels describing various characteristics of the content provided by annotators as described in further detail below.

The machine learning engine 126 trains the machine learning models based on the content items and annotations identified for the jobs. The machine learning engine 126 may furthermore apply the machine learning models to generate predictions for unannotated content items. The machine learning engine 126 may utilize techniques such as neural networks, classification, regression, or other computer-based learning techniques. Parameters (e.g., weights) associated with machine learning models are stored to the ML model database 124.

The UI engine 112 interfaces with the annotation application 122 and the administrative application 132 to enable presentation of various information displays, controls, and content items and to process inputs received from the annotation application 122 and administrative application 132 as described herein. In an embodiment, the UI engine 112 may include a web server for providing the annotation application 122 and/or the administrative application 132 via web interface accessible by a browser. Alternatively, the UI engine 112 may comprise an application server for interfacing with locally installed versions of an annotation application 122 and/or administrative application 132. In an embodiment, the UI engine 112 may also enable direct access to the annotation database 118 to enable data scientists to manually review annotations and develop improvements to the machine learning process.

The client device 120 and administrative device 130 comprise computer devices for executing an annotation application 122 and administrative application 132 respectively. The annotation application 122 facilitates presentation of information and collection of user inputs associated with presenting content items and obtaining labels from annotators via the client device 120. The annotation application 122 may further track a state of progress of an annotator associated with an annotation job such that the user can close the annotation application 122 and return the same state at a later time. Thus, the user need not necessarily complete the annotation job all at once, and may instead annotate a few content items at a time or otherwise progress through annotation job as convenient. Example embodiments of user interfaces associated with the annotation application 122 are provided below with respect to FIGS. 3-5. The administrative application 132 facilitates presentation of information and collection of inputs from an administrator in association with the creation or updating of jobs and viewing of information associated with jobs. Example embodiments of user interfaces associated with the administrative application 132 are provided below with respect to FIGS. 6-8.

The client device 120 and administrative device 130 may each comprise, for example, a mobile phone, a tablet, a laptop or desktop computer, or other computing device. The annotation application 122 and administrative applications 132 may execute locally on the respective client devices 120, 130 or may comprise a web application (e.g., hosted by a remote server) accessed via a web browser. The client device 120 and administrative device 130 may each include conventional computer hardware such as a display, input device (e.g., touch screen), memory, a processor, and a non-transitory computer-readable storage medium that stores instructions for execution by the processor in order to carry out the functions attributed to the respective devices 120, 130 described herein.

The network 140 comprises communication pathways for communication between the client device 120, the administrative device 130, the annotation server 110 and other devices. The network 140 may include one or more local area networks and/or one or more wide area networks (including the Internet). The network 140 may also include one or more direct wired or wireless connections.

Figure 2:
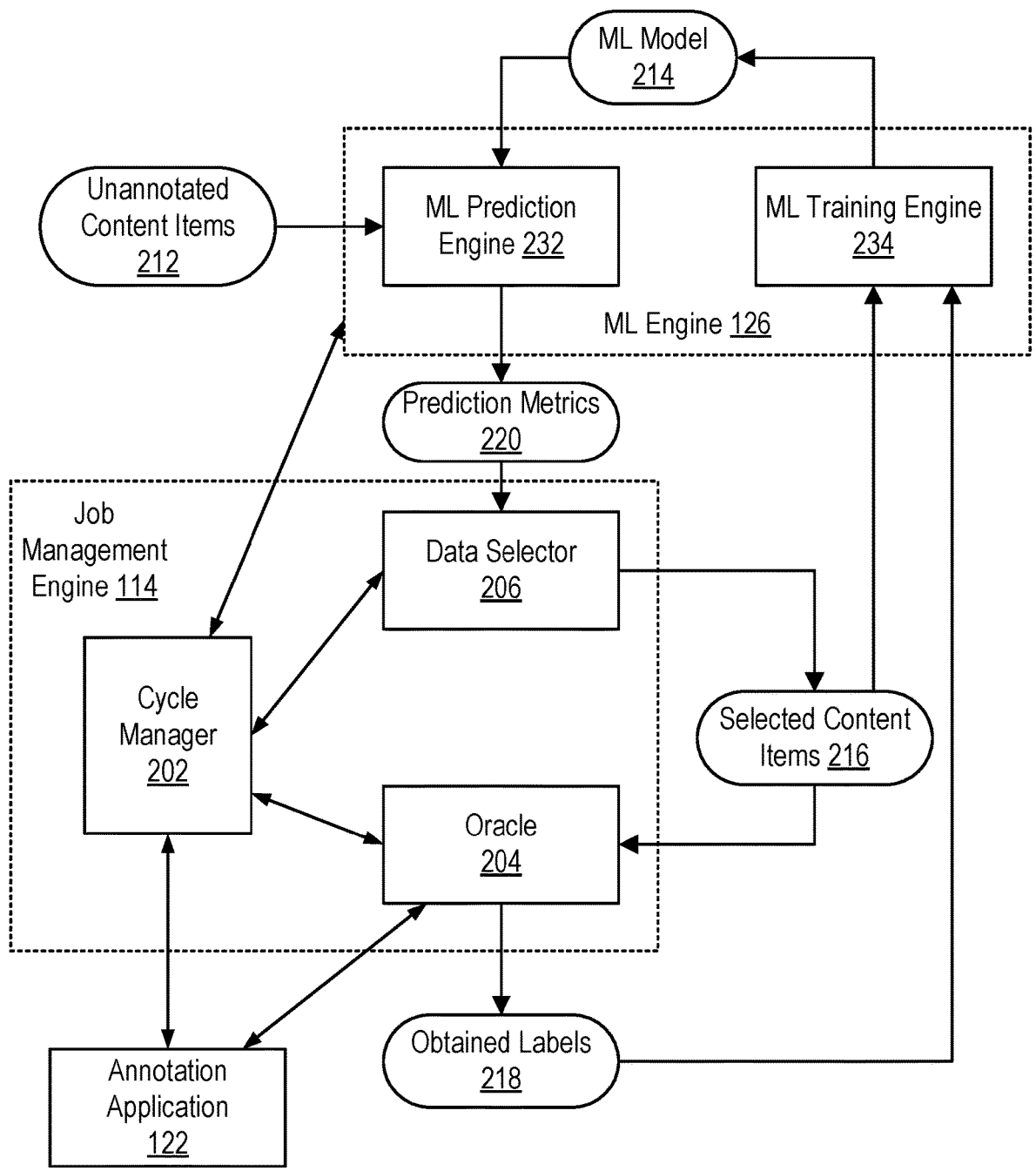
FIG. 2 is an example embodiment of a job management engine for managing an annotation job.

FIG. 2 illustrates an example embodiment of a job management engine 114 and its interactions with the ML engine 126, which includes an ML prediction engine 232 and an ML training engine 234. In this embodiment, the job management engine 114 includes a cycle manager 202, an oracle 204, and a data selector 206.

The ML prediction engine 232 receives unannotated content items 212 (e.g., from the content database 116) associated with a particular job and applies the relevant machine learning model 214 associated with the job to determine prediction metrics 220 associated with predictions of labels for the unannotated content items 212. The prediction metrics may comprise, for example, confidence levels associated with predictions made by the ML prediction engine 232. Alternatively, the prediction metrics may comprise an entropy-based score or an similarity score indicative of similarity between the content item and other content items that have already received annotations.

The data selector 206 selects, based on the prediction metrics 220, a set of selected content items 216 from the content database 116 for annotating in association with the job. The data selector 206 selects content items 216 that it predicts can best contribute to improving performance of the machine learning model 214 if included in a training set. In one example embodiment, this selection criterion may be dependent on the confidence levels associated with prediction. Under this framework, if the ML prediction engine 232 predicts a label for an unannotated content item 212 with a relatively low confidence level (as indicated in the prediction metrics 220), this indicates that the current ML model 214 performs relatively poorly for that content item 212 and that obtaining manual annotations for that content item 212 could therefore result in relatively significant improvement to the machine learning model 214 for other content items with similar characteristics. If the ML prediction engine 232 instead predicts a label for the unannotated content item 212 with relatively high confidence, this indicates that the ML model 214 already performs relatively strongly for that content item and that obtaining manual annotations for that content item 212 may not result in significant improvement. In another embodiment, the data selector 206 may select content items 212 for annotation based on an entropy metric. Alternatively, the prediction metrics 220 could include a similarity score indicative of similarity between a content item 212 and other content items that have already been annotated. Here, content items that are least similar (e.g., have a similarity score below a predefined threshold) are most likely to contribute to improved performance of the machine learning model and may be selected by the data selector 206. In further embodiments, the data selector 206 may employ other data mining strategies or combinations of techniques.

In one embodiment, the data selector 206 evaluates a prediction metric 220 for each content item 212 individually and determines to include the content item 212 in the set of selected content items 216 if the prediction metric 220 is below a threshold level. In another embodiment, the data selector 206 evaluates a batch of prediction metrics 220 for respective content items 212 and then selects a predefined number or percentage of the content items 212 in the batch for inclusion in the set of selected content items 216 corresponding to the content items 212 having the lowest relative prediction metrics 220.

The oracle 204 interfaces with the annotation application 122 of the client devices 120 to obtain labels 218 for the selected content items 216 chosen for annotation. The oracle 204 may control, based on the job description, which annotators from the pool of annotators have access to the selected content items 216 for annotations and which labels can be assigned to the content items. The oracle 204 may also aggregate results of the annotations received from the client devices 120 and filter out any content items that have been flagged by an annotator as containing bad data (e.g., content items not in the relevant category, content items of low quality, etc.) The annotations received by the oracle 204 may be stored to the annotation database 118 as described above.

The ML training model 234 trains (or updates) the machine learning model 214 associated with a particular job based on the obtained labels 218 received from the oracle 204 and the associated selected content items 216. The ML training engine 234 may operate continuously to perform updates as new obtained labels 218 are received or may execute responsive to a trigger (e.g., an amount of time passing since the last update, a predefined number of new labels 218 being received, etc.)

The cycle manager 202 tracks progress of each annotation job and determines when a job is complete. Here, the cycle manager 202 may deem a job complete when a predefined set of completion criteria associated with the job are met, such as, for example, obtaining labels 218 for at least a predefined number of content items 216, achieving at least a predefined average prediction metric 220 for predictions made by the ML prediction engine 232, detecting when the predictions by the ML prediction engine 232 stop improving, or meeting other predefined metrics associated with a job.

Figure 3:
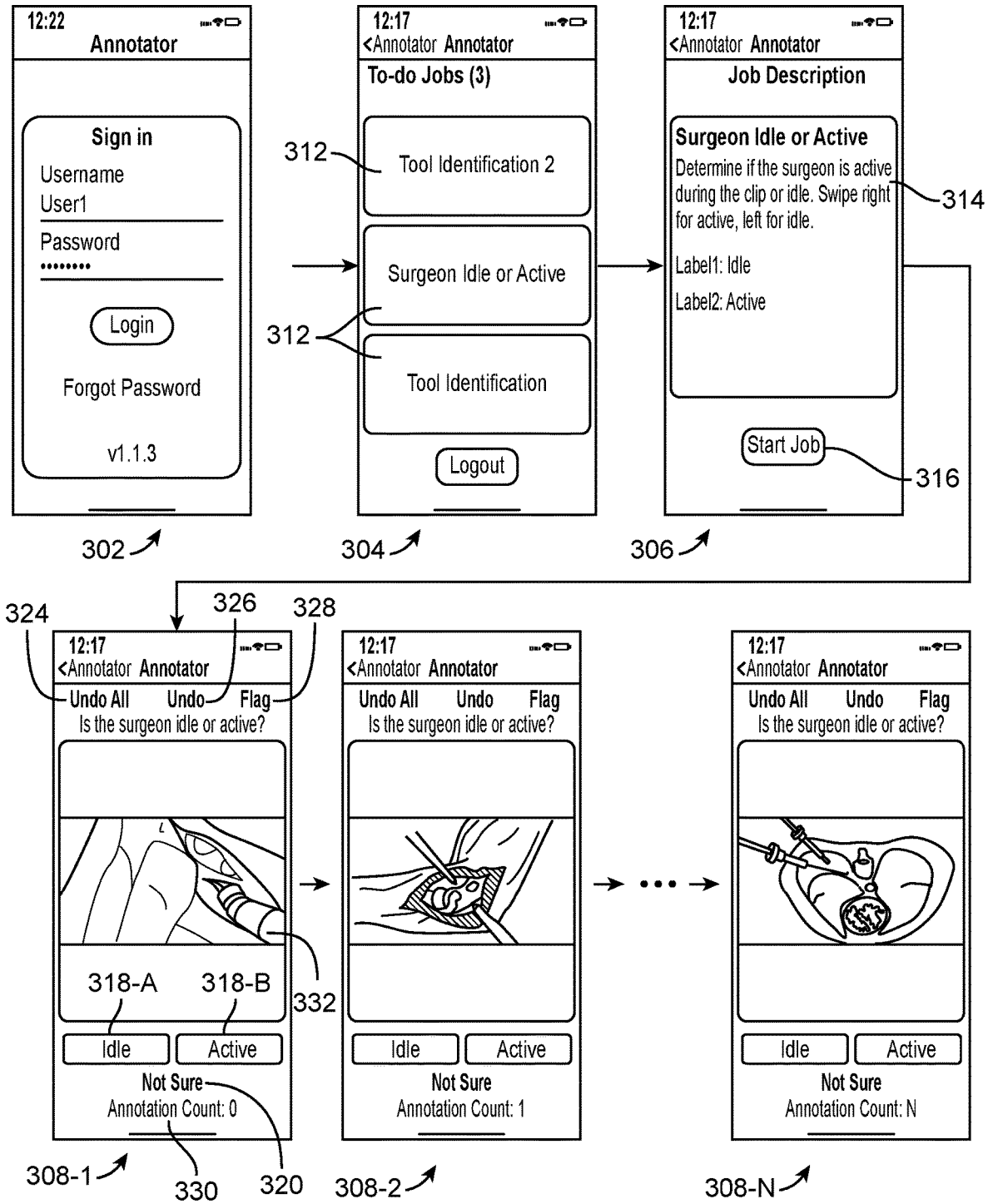
FIG. 3 is an example sequence of user interface screens associated with an annotation application.

FIG. 3 is an example sequence of user interfaces presented to an annotator via the annotation application 122 for obtaining annotations of surgical media content such as video clips, images, or animations (e.g., gifs). A login screen 302 enables a user to provide credentials (e.g., username and password) for logging into the annotation server 110. Upon receiving and authenticating the login credentials, the annotation server 110 accesses a user profile associated with the user and identifies open annotation jobs for the user. The identified annotation jobs may include annotation jobs specifically assigned to that user (e.g., based on a user identifier) or may include annotation jobs that are matched to that user upon login. Here, annotation jobs may be matched to a user based on information in the user profile (e.g., area of expertise, level of experience, participation availability, etc.) and metadata associated with the job. A job list screen 304 presents a list of selectable control elements 312 associated with the different available jobs for the user. Upon selecting a job (e.g., in this case, selecting "Surgeon Idle or Active"), the annotation application 122 presents a job description screen 306 with a description 314 of the selected job and instructions to the user. Here, for example, the job description screen 306 specifies that the user should "determine if the surgeon is active during the clip or idle" and to "swipe right for active, left for idle." The job description screen 306 also indicates that there are two possible labels to choose from in this job, either "idle" or "active." The user can proceed with the job by selecting the "start job" control element 316. The annotation application 122 then presents a sequence of annotation screens 308 (e.g., annotation screens 308-1, 308-2, . . . , 308-N) including content items 332 (in this case, video clips) for the annotator to review and label. In this example, the annotator can select between the two labels ("idle" or "active") either by selecting the corresponding control element 318-A, 318-B or by performing a corresponding gesture. For example, using a touchscreen device, the user may swipe left on the touch screen to select "idle" or swipe right on the touch screen to select "active." Alternatively, the user interface may enable selection of a label by voice input or other type of input.

The user also has an option to select a control element 320 "not sure" to decline to provide a label for the content item 332 and skip to the next one. The annotation screens 308 furthermore include control elements for undoing the current label selection 326 or undoing all label selections 324 provided during the current session. In an embodiment, the annotation screen 308 may also provide a control element 328 to enable the user to flag a content item 332. Flagging a content item 332 may automatically remove it from the job or may flag it for review by the job administrator. Flagging a content item may be useful to indicate, for example, that the content item 332 is not relevant to the job, is of a low quality, contains occlusions, or otherwise may not be suitable for training a machine learning model. The annotation screen 308 may also include an annotation count 330 to indicate the cumulative number of content items that the annotator has labeled during the current session.

In an embodiment, the annotation application 122 may track one or more jobs that a user has started and automatically return to that job if the user exits and later restarts the application 122. This enables annotators to quickly begin annotating, take breaks when needed, and return where they left off so that they may contribute annotations on a convenient time schedule.

Figure 4:
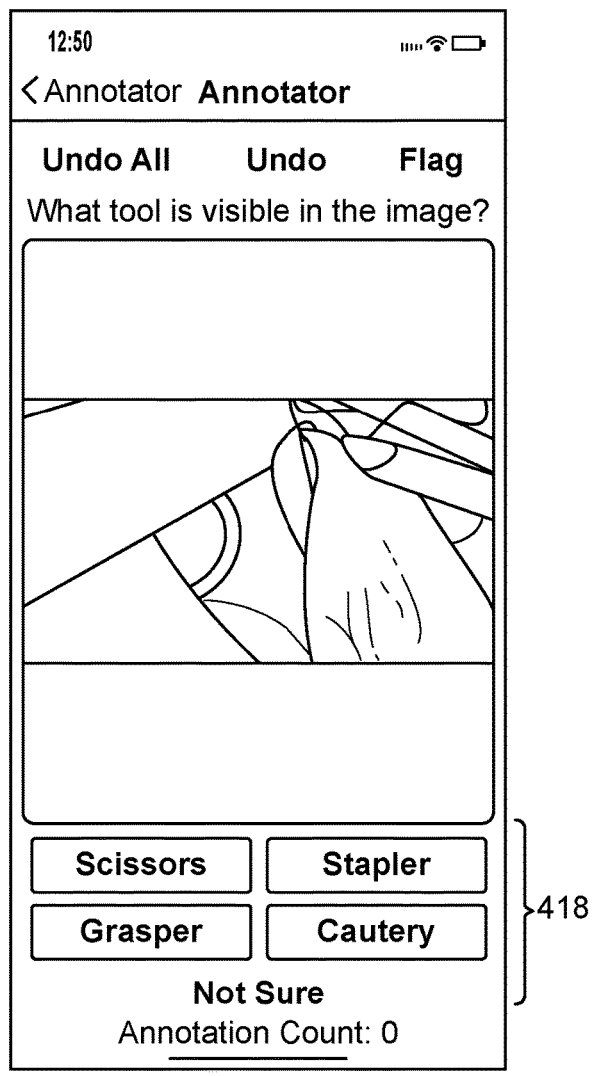
FIG. 4 is another example of a user interface screen associated with an annotation application.

FIG. 4 illustrates an example of an annotation screen 408 associated with a different job. In this example, the job is configured to request a single label from an annotator selected between four predefined labels 418. The annotator may choose the label by selecting the associated control element. Alternatively, swipe gestures may be preassigned to different labels to enable selection (e.g., swipe up and to the left to select "scissors," swipe down and to the left to select "grasper", swipe up and to the right to select "stapler", and swipe down and to the right to select "cautery.")

Figure 5:
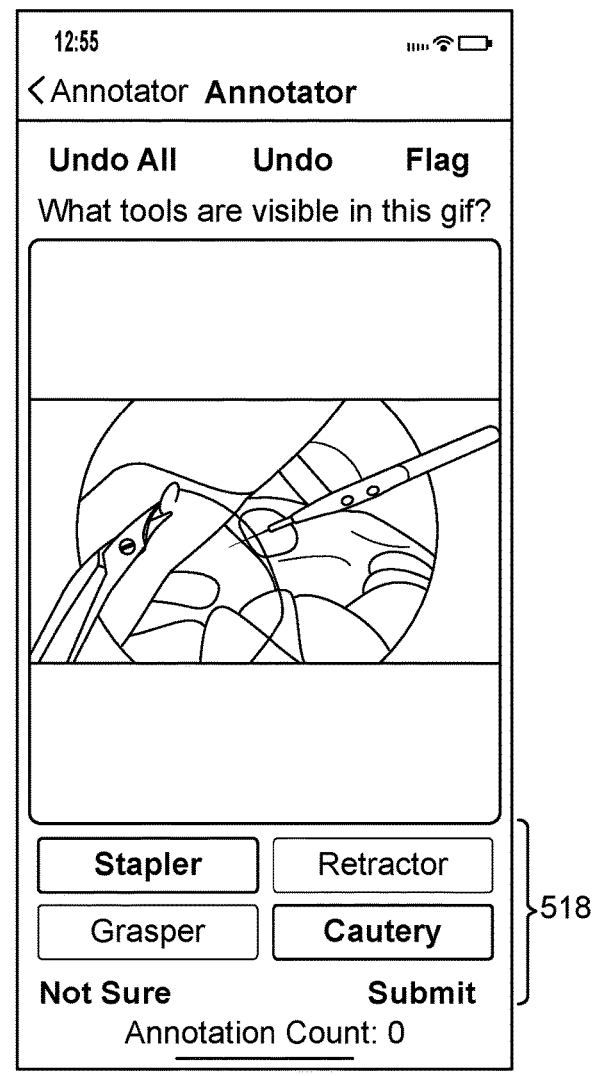
FIG. 5 is yet another example of a user interface screen associated with an annotation application.

FIG. 5 illustrates another example of an annotation screen 508 associated with yet another job. In this example, the job is configured to enable multiple labels 518 for a single content item (e.g., between zero and four labels). The annotator may select labels using the control elements on the screen or by a combination of gestures as described above.

FIG. 6 illustrates an example embodiment of a user interface screen 600 for an administrator application 132 in association with creating and/or configuring an annotation job. The interface enables a job creator to provide information such as: a name for the job; a description of the job; a type of job (e.g., single label select or multi-label select), a number of labels, names for the predefined set of labels, and a number of judgments.

FIG. 7 also illustrates another user interface screen 700 for an administrator application 132 that enables the administrator to assign the job to a specific set of annotators. In the illustrated embodiment, the annotators are listed by a unique identifier (e.g., username). Alternatively, the annotators could be identified using various labels characterizing them such as area of expertise, availability, experience level, etc. to enable an administrator to identify a set of annotators meeting defined characteristics without necessarily individually identifying them. In further embodiments, annotators may be preassigned to one or more groups of annotators and the administrator can assign a job to one or more groups.

FIG. 8 illustrates an example of a user interface screen 800 for an administrator application 132 for viewing and editing a set of jobs. This screen provides a list of jobs 802 (e.g., identified by name and/or a unique identifier) and various parameters 804 associated with the job. An administrator may select a job to view additional information, delete the job, or edit parameters associated with the job.

Figure 9:
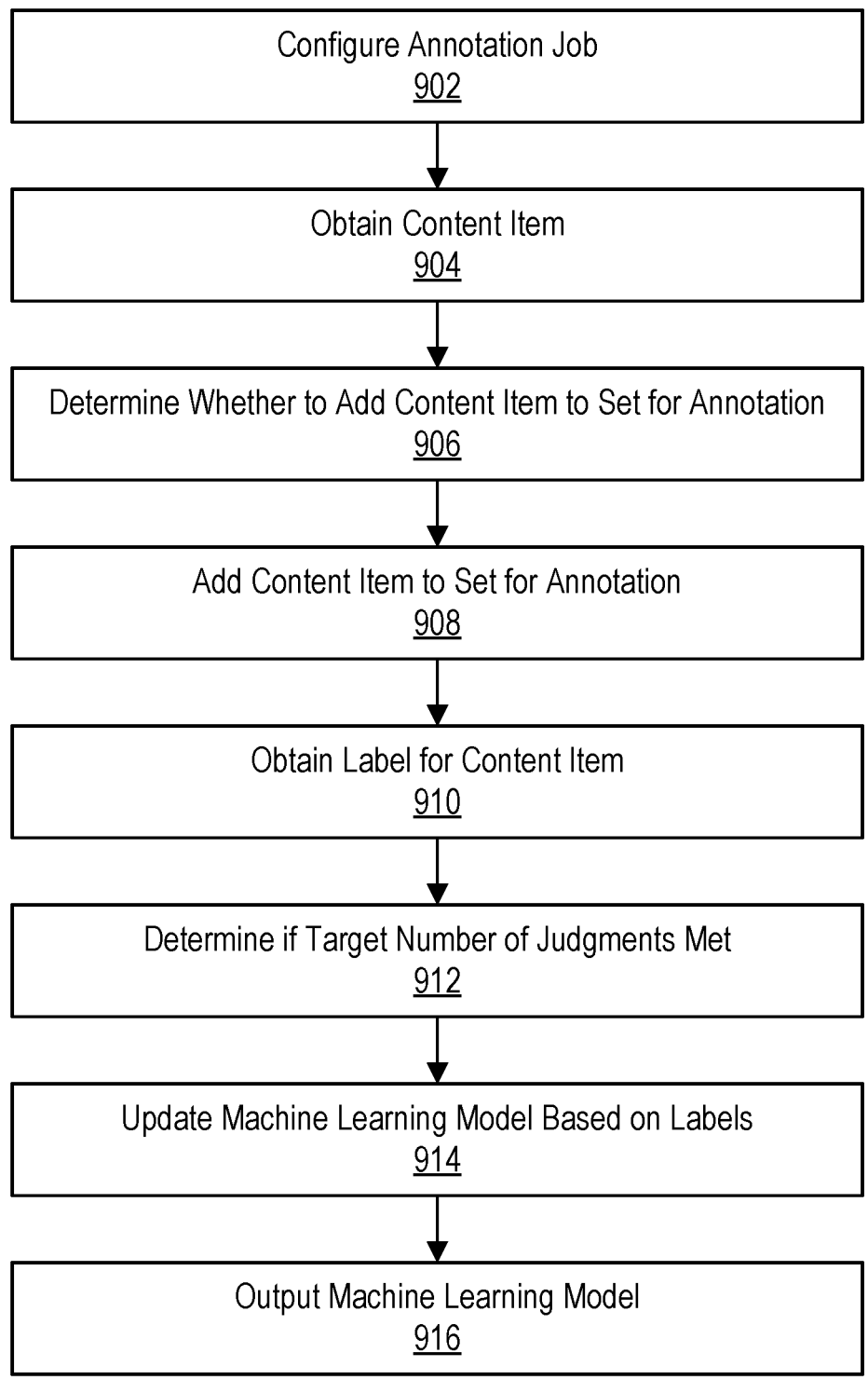
FIG. 9 is an example embodiment of a process for facilitating training of a machine learning model based on labels collected via an annotation system.

FIG. 9 illustrates an example embodiment of a process for generating or updating a machine learning model based on annotations received via a annotation application 122. The annotation server 110 configures 902 an annotation job associated with a machine learning model (e.g., based on input from an administrative device 130) to specify a set of criteria including, for example, a pool of one or more annotators, labeling rules indicating a quantity of labels (or range of quantities) that the annotator can select, a predefined set of selectable labels, and a target number of judgments. The annotation server 110 obtains 904 a content item that is initially unannotated. The annotation server 110 determines 906 whether to add the content item to the set for annotation in association with the job. For example, the annotation server 110 may apply the machine learning model to generate a prediction for the content item and a confidence metric associated with the prediction. The annotation server 110 then adds 908 the content item to the set for annotation responsive to the confidence metric failing to meet the confidence threshold. The annotation server 110 obtains 910 at least one selected label from the predefined set of selectable labels via the annotation application 122. For example, the annotation server 110 facilitates presentation of the content item to at least one of the annotators in the pool via a user interface of the annotation application 122 of the client device 120. The annotation server 110 then determines 912 if the target number of judgments is met for the content item based on the cumulative set of labels received for the content item from the pool of annotators.

Responsive to the target number of judgments being met, the annotation server 110 updates 914 parameters of the machine learning model by using the obtained labels to retrain the machine learning model. The annotation server 110 then outputs 916 the machine learning model (e.g., by storing it to the machine learning model database 124).

The machine learning models generated from the above-described annotation system 100 may be utilized in a variety of contexts. For example, the machine learning models may be applied to pre-operative, intra-operative, or post-operative surgical images or video to automatically classify images in a surgical context. The machine learning models may similarly be applied to other medical images or video for the purpose of diagnosing, treating, or researching medial conditions. In other alternative embodiments, the annotation system 100 described herein may be utilized for obtaining labels and training machine learning models associated with other types of content items that are not necessarily related to the medical field.

Embodiments of the described annotation system 100 and corresponding processes may be implemented by one or more computing systems. The one or more computing systems include at least one processor and a non-transitory computer-readable storage medium storing instructions executable by the at least one processor for carrying out the processes and functions described herein. The computing system may include distributed network-based computing systems in which functions described herein are not necessarily executed on a single physical device. For example, some implementations may utilize cloud processing and storage technologies, virtual machines, or other technologies.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible non-transitory computer readable storage medium or any type of media suitable for storing electronic instructions and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope is not limited by this detailed description, but rather by any claims that issue on an application based hereon. Accordingly, the disclosure of the embodiments is intended to be illustrative, but not limiting, of the scope of the invention, which is set forth in the following claims.

The invention claimed is:

1. A method for facilitating collection of annotations for images or video associated with a surgical application for training of a machine learning model, the method comprising:
   obtaining over a computer network at an annotation server, inputs from an administrative user interface of an administrator application executing on an administrative client device, the inputs corresponding to a set of predefined input fields, and the inputs specifying at least an assignment of an annotation job to a set of annotators selectable from a predefined list of available annotators, inclusion criteria for identifying content items for annotating in the annotation job, a predefined set of selectable labels for the annotation job, and a target number of judgments for the annotation job;
   configuring, by a job management engine of an annotation server, an annotation job associated with the machine learning model based on the inputs;
   obtaining, from a content database based on the inputs, a set of unannotated content items meeting the inclusion criteria;
   for each of the set of unannotated content items:
      applying the machine learning model to generate a prediction associated with the content item and a confidence metric associated with the prediction;
      determining if the confidence metric meets a predefined confidence threshold; and
      responsive to the confidence metric failing to meet the confidence threshold, adding the content item to an annotation set associated with the annotation job;
   facilitating availability of an on-demand annotation sessions for the set of annotators via respective annotation application executing on respective annotator client devices, wherein during an on-demand annotation session, an annotation application sequentially presents content items from the annotation set, obtains selections of respective labels via interactions captured in a user interface of the annotation application, and transmits the selections to the annotation server;
   at the annotation server, obtaining and aggregating the respective labels for the presented content items obtained from the on-demand annotation sessions to generate aggregated label data;
   determining, for each of the content items in the annotation set based on the aggregated label data, if the target number of judgments is met; and
   responsive to the target number of judgments being met for a given content item in the annotation set, adding the given content item and the aggregated label data to a training set;
   updating parameters of the machine learning model by training the machine learning model using the training set; and
   storing the machine learning model.

2. The method of claim 1, wherein obtaining the selections of the respective labels comprises:
   identifying a swipe gesture performed with respect to the user interface; and
   selecting between the predefined set of selectable labels based on a direction of the swipe gesture.

3. The method of claim 1, wherein obtaining the selections of the respective labels comprises:
   facilitating via the user interface, presentation of user interface elements respectively associated with the predefined set of selectable labels; and selecting between the predefined set of selectable labels based on a selection of one of the user interface elements.

4. The method of claim 1, wherein the inputs further specify a labeling rule indicating a number of selectable labels that can be selected for each of the content items by a single annotator.

5. The method of claim 1, wherein selections of the respective labels comprises:
enforcing via the user interface, selection of one and only one of the predefined set of selectable labels.

6. The method of claim 1, wherein selections of the respective labels comprises:
enabling via the user interface, selection of any number of the predefined set of selectable labels.

7. The method of claim 1, wherein sequentially presenting the content items during the on-demand annotation session comprises:
responsive to obtaining at least one selected label for a presented content item, automatically facilitating, by the annotation application, presentation of another content item via the user interface of the annotation application.

8. The method of claim 1, wherein the target number of judgments comprises a number of unique annotators that have provided at least one label for the content item.

9. The method of claim 2, wherein selecting between the predefined set of selectable labels based on the direction of the swipe gesture comprises:
selecting between a first predefined label in response to the swipe gesture being performed in a first direction and second predefined label in response to the swipe gesture being performed in a second direction opposite the first direction.

10. The method of claim 2, wherein
selecting between the predefined set of selectable labels based on the direction of the swipe gesture comprises:
selecting between a first predefined label in response to the swipe gesture being performed in a first direction, a second predefined label in response to the swipe gesture being performed in a second direction, a third predefined label in response to the swipe gesture being performed in a third direction, and a fourth predefined label in response to the swipe gesture being performed in a fourth direction.

11. The method of claim 1, wherein the content items at least one of: an image, a video, or an animation.

12. The non-transitory computer-readable storage medium method of claim 1, wherein the instructions when executed further cause the one or more processors to perform steps including: wherein the annotation application further presents presenting a control element to flag the content item for review by an administrator; and storing the flag in association with the content item responsive to selection of the control element.

13. The method of claim 1, wherein facilitating the availability of the on-demand annotations sessions comprises:
tracking a state of the annotation application that records progress of annotations by annotator during an on-demand annotation session; and
responsive to the annotation application closing and subsequently re-opening, configuring the annotation application based on the tracked state.

14. A non-transitory computer-readable storage medium storing instructions for facilitating collection of annotations of images or video associated with a surgical application for training of a machine learning model, the instructions when executed by one or more processors causing the one or more processors to performs steps comprising:
obtaining over a computer network at an annotation server, inputs from an administrative user interface of an administrator application executing on an administrative client device, the inputs corresponding to a set of predefined input fields, and the inputs specifying at least an assignment of an annotation job to a set of annotators selectable from a predefined list of available annotators, inclusion criteria for identifying content items for annotating in the annotation job, a predefined set of selectable labels for the annotation job, and a target number of judgments for the annotation job;
configuring, by a job management engine of an annotation server, an annotation job associated with the machine learning model based on the inputs;
obtaining, from a content database based on the inputs, a set of unannotated content items meeting the inclusion criteria;
for each of the set of unannotated content items:
applying the machine learning model to generate a prediction associated with the content item and a confidence metric associated with the prediction;
determining if the confidence metric meets a predefined confidence threshold; and
responsive to the confidence metric failing to meet the confidence threshold, adding the content item to an annotation set associated with the annotation job;
facilitating availability of an on-demand annotation sessions for the set of annotators via respective annotation application executing on respective annotator client devices, wherein during an on-demand annotation session, an annotation application sequentially presents content items from the annotation set, obtains selections of respective labels via interactions captured in a user interface of the annotation application, and transmits the selections to the annotation server;
at the annotation server, obtaining and aggregating the respective labels for the presented content items obtained from the on-demand annotation sessions to generate aggregated label data;
determining, for each of the content items in the annotation set based on the aggregated label data, if the target number of judgments is met; and
responsive to the target number of judgments being met for a given content item in the annotation set, adding the given content item and the aggregated label data to a training set;
updating parameters of the machine learning model by training the machine learning model using the training set; and
storing the machine learning model.

15. The non-transitory computer-readable storage medium of claim 14, wherein obtaining the selections of the respective labels comprises:
identifying a swipe gesture performed with respect to the user interface; and
selecting between the predefined set of selectable labels based on a direction of the swipe gesture.

16. The non-transitory computer-readable storage medium of claim 14, wherein obtaining the selections of the respective labels comprises:
facilitating via the user interface, presentation of user interface elements respectively associated with the predefined set of selectable labels; and selecting between the predefined set of selectable labels based on a selection of one of the user interface elements.

17. The non-transitory computer-readable storage medium of claim 14, wherein the inputs further specify a labeling rule indicating a number of selectable labels that can be selected for each of the content items by a single annotator.

18. A computer system comprising:
one or more processors; and
a non-transitory computer-readable storage medium storing instructions for facilitating collection of annotations of images or video associated with a surgical application for training of a machine learning model, the instructions when executed by the one or more processors causing the one or more processors to performs steps comprising:
obtaining over a computer network at an annotation server, inputs from an administrative user interface of an administrator application executing on an administrative client device, the inputs corresponding to a set of predefined input fields, and the inputs specifying at least an assignment of an annotation job to a set of annotators selectable from a predefined list of available annotators, inclusion criteria for identifying content items for annotating in the annotation job, a predefined set of selectable labels for the annotation job, and a target number of judgments for the annotation job;
configuring, by a job management engine of an annotation server, an annotation job associated with the machine learning model based on the inputs;
obtaining, from a content database based on the inputs, a set of unannotated content items meeting the inclusion criteria;
for each of the set of unannotated content items:
applying the machine learning model to generate a prediction associated with the content item and a confidence metric associated with the prediction;
determining if the confidence metric meets a predefined confidence threshold; and
responsive to the confidence metric failing to meet the confidence threshold, adding the content item to an annotation set associated with the annotation job;
facilitating availability of an on-demand annotation sessions for the set of annotators via respective annotation application executing on respective annotator client devices, wherein during an on-demand annotation session, an annotation application sequentially presents content items from the annotation set, obtains selections of respective labels via interactions captured in a user interface of the annotation application, and transmits the selections to the annotation server;
at the annotation server, obtaining and aggregating the respective labels for the presented content items obtained from the on-demand annotation sessions to generate aggregated label data;
determining, for each of the content items in the annotation set based on the aggregated label data, if the target number of judgments is met; and
responsive to the target number of judgments being met for a given content item in the annotation set, adding the given content item and the aggregated label data to a training set;
updating parameters of the machine learning model by training the machine learning model using the training set; and
storing the machine learning model.

19. The computer system of claim 18, wherein obtaining the selections of the respective labels comprises:
identifying a swipe gesture performed with respect to the user interface; and
selecting between the predefined set of selectable labels based on a direction of the swipe gesture.

20. The computer system of claim 18, wherein obtaining the selections of the respective labels comprises:
facilitating via the user interface, presentation of user interface elements respectively associated with the predefined set of selectable labels; and
selecting between the predefined set of selectable labels based on a selection of one of the user interface elements.

* * * * *